(12) United States Patent
O'Bleness et al.

(10) Patent No.: US 8,806,181 B1
(45) Date of Patent: *Aug. 12, 2014

(54) DYNAMIC PIPELINE RECONFIGURATION INCLUDING CHANGING A NUMBER OF STAGES

(75) Inventors: R. Frank O'Bleness, Tempe, AZ (US); Sujat Jamil, Gilbert, AZ (US); Timothy S. Beatty, Chandler, AZ (US); Franco Ricci, Chandler, AZ (US); Tom Hameenanttila, Phoenix, AZ (US); Hong-Yi Chen, Fremont, CA (US)

(73) Assignee: Marvell International Ltd., Hamilton (BE)

( * ) Notice: Subject to any disclaimer, the term of this patent is extended or adjusted under 35 U.S.C. 154(b) by 953 days.

This patent is subject to a terminal disclaimer.

(21) Appl. No.: 12/434,155

(22) Filed: May 1, 2009

Related U.S. Application Data

(60) Provisional application No. 61/050,369, filed on May 5, 2008, provisional application No. 61/054,731, filed on May 20, 2008, provisional application No. 61/082,652, filed on Jul. 22, 2008.

(51) Int. Cl.
*G06F 9/38* (2006.01)
(52) U.S. Cl.
CPC .................... *G06F 9/3873* (2013.01)
USPC ........................ 712/228; 712/229
(58) Field of Classification Search
CPC ................................................ G06F 9/3873
See application file for complete search history.

(56) References Cited

U.S. PATENT DOCUMENTS

| 5,440,703 | A | * | 8/1995 | Ray et al. ....................... 712/228 |
| 5,442,756 | A | * | 8/1995 | Grochowski et al. ......... 712/238 |
| 5,471,626 | A | * | 11/1995 | Carnevale et al. ............ 712/219 |
| 5,778,250 | A | * | 7/1998 | Dye .............................. 712/32 |
| 5,802,331 | A | * | 9/1998 | Van Berkel ....................... 712/1 |
| 5,974,538 | A | * | 10/1999 | Wilmot, II .................... 712/218 |
| 6,829,697 | B1 | * | 12/2004 | Davis et al. .................... 712/21 |
| 2003/0037226 | A1 | * | 2/2003 | Tsuruta et al. ................ 712/228 |
| 2003/0149905 | A1 | * | 8/2003 | Santhanam et al. .......... 713/500 |
| 2003/0226000 | A1 | * | 12/2003 | Rhoades ....................... 712/218 |
| 2004/0003309 | A1 | * | 1/2004 | Cai et al. ....................... 713/320 |
| 2005/0251699 | A1 | * | 11/2005 | Jacobson ....................... 713/400 |
| 2006/0112233 | A1 | * | 5/2006 | Hu et al. ....................... 711/138 |
| 2006/0200651 | A1 | * | 9/2006 | Collopy et al. ................ 712/220 |
| 2008/0028256 | A1 | * | 1/2008 | Lichtensteiger et al. ..... 713/600 |
| 2009/0070602 | A1 | * | 3/2009 | Ingle et al. .................... 713/300 |
| 2009/0138674 | A1 | * | 5/2009 | Chang et al. .................... 712/23 |
| 2009/0292907 | A1 | * | 11/2009 | Schwinn et al. .............. 712/229 |

OTHER PUBLICATIONS

Jacobson (Improved Clock-Gating through Transparent Pipelining); This paper appears in: Low Power Electronics and Design, 2004. ISLPED '04. Proceedings of the 2004 International Symposium on; Issue Date: 2004; on pp. 26-31.*
Koppanalil (A Case for Dynamic Pipeline Scaling); CASES '02 Proceedings of the 2002 international conference on Compilers, architecture, and synthesis for embedded systems; 8 pages, 2002.*

* cited by examiner

*Primary Examiner* — Keith Vicary

(57) ABSTRACT

According to some embodiments, an apparatus having corresponding methods includes a storage module configured to store data and instructions; a first processor pipeline configured to process the data and instructions when the first processor pipeline is selected; a second processor pipeline configured to process the data and instructions when the second processor pipeline is selected; and a selection module configured to select either the first processor pipeline or the second processor pipeline.

12 Claims, 7 Drawing Sheets

US 8,806,181 B1

DYNAMIC PIPELINE RECONFIGURATION INCLUDING CHANGING A NUMBER OF STAGES

CROSS-REFERENCE TO RELATED APPLICATIONS

This application claims the benefit of U.S. Provisional Patent Application Ser. No. 61/054,731, filed on May 20, 2008, U.S. Provisional Patent Application Ser. No. 61/082,652, filed on Jul. 22, 2008, and U.S. Provisional Patent Application Ser. No. 61/050,369, filed on May 5, 2008, the disclosure thereof incorporated by reference herein in its entirety.

BACKGROUND

The present disclosure relates generally to pipelined microprocessors. More particularly, the present disclosure relates to dynamic selection of pipeline depth for such microprocessors.

In order to improve instruction throughput, microprocessors are often pipelined. Pipelining creates stages with state elements that are clocked at a higher frequency than could be achieved without pipelining. The clock power consumed by these state elements is typically the largest active power component of a microprocessor.

In some handheld microprocessor applications, the voltage of the microprocessor is dynamically controlled by a voltage controller to use the lowest possible level of power for a particular application. However, the voltage controller generally cannot reduce the voltage below the process Vmin without risking failure of the microprocessor to perform. Consequently, the power consumed exceeds what otherwise would be necessary for the application. This power is wasted and may directly impact battery life or other power parameters.

SUMMARY

In general, in one aspect, an embodiment features an apparatus including: a storage module adapted to store data and instructions; a first processor pipeline adapted to process the data and instructions when the first processor pipeline is selected; a second processor pipeline adapted to process the data and instructions when the second processor pipeline is selected; and a selection module to select either the first processor pipeline or the second processor pipeline.

In general, in one aspect, an embodiment features a method including: providing a storage module and processor pipelines; storing data and instructions in the storage module; selecting one of the processor pipelines; and processing the data and instructions with the selected one of the processor pipelines only.

In general, in one aspect, an embodiment features an apparatus including: a storage module adapted to store data and instructions; a processor pipeline adapted to process the data and instructions, where the processor pipeline includes stages; and a processor pipeline depth control module adapted to change a number of the stages in the processor pipeline.

In general, in one aspect, an embodiment features a method including: providing a storage module and a processor pipeline, where the processor pipeline includes stages; storing data and instructions in the storage module; changing a number of the stages in the processor pipeline; and processing the data and instructions with the processor pipeline.

The details of one or more implementations are set forth in the accompanying drawings and the description below. Other features will be apparent from the description and drawings, and from the claims.

Figure 1:
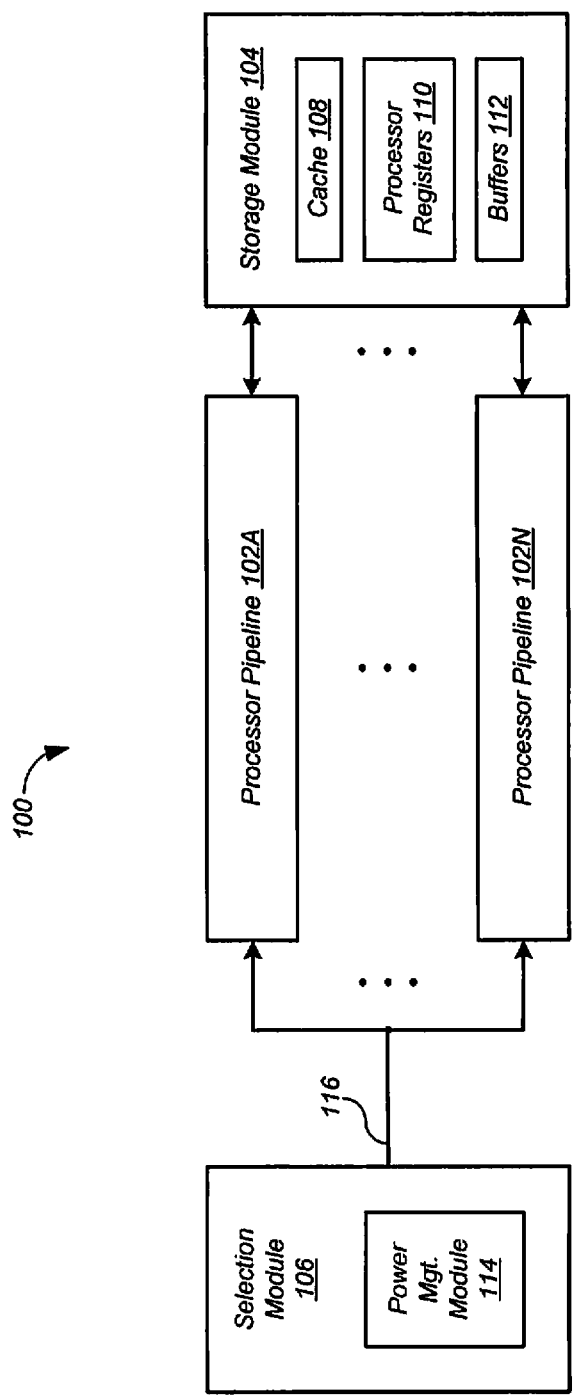
FIG. 1 shows elements of a microprocessor including multiple instruction pipelines according to one embodiment.

The leading digit(s) of each reference numeral used in this specification indicates the number of the drawing in which the reference numeral first appears.

DETAILED DESCRIPTION

The subject matter of the present disclosure relates to dynamic pipeline reconfiguration for pipelined microprocessors. The pipelines can be instruction pipelines, execution pipelines, memory pipelines, and the like. According to some embodiments, the microprocessor includes two or more pipelines of differing complexity. In such embodiments, a complex pipeline can be selected for higher performance, and a simple pipeline can be selected for power savings. In other embodiments, a single pipeline of variable depth is provided. Pipeline depth describes the number of stages, or depth, of a processor pipeline. In such embodiments, the pipeline can be lengthened for high performance, and shortened for power savings. Still other embodiments employ a combination of these two techniques.

Dynamic selection of microprocessor processor pipeline depth can be used to optimize low-power modes, which can be used to conserve battery power in portable devices. Each stage of a microprocessor processor pipeline terminates with a state element that is driven by a clock. The delay of each stage is typically minimized so the clock can be run at a frequency that yields the desired performance. Active power is typically governed by the relationship $CV^2f$. The gate load C of the clock is directly proportional to the number of state elements. Therefore, in the simplest sense, e.g., ignoring the underlying microarchitecture, the power consumed by a pipeline is proportional to the depth of the pipeline.

As one example, a mobile phone can have a high-performance mode for video applications, and a low-power mode when video is not required. The high-performance mode can employ a deeper pipeline than the low-power mode. For example, in high-performance mode the microprocessor may employ 16 pipeline stages, while in low-power mode the microprocessor may employ only eight pipeline stages. Other techniques can be combined with dynamic selection of microprocessor processor pipeline depth to implement these different modes, for example including changing the voltage level and clock speed. In the above example, the microprocessor can be supplied with 1.2V and clocked at 1 GHz under typical operation; however, in low-power mode the voltage and clock speed can be reduced to 0.8V and 200 MHz, respectively.

Microprocessors according to various embodiments can be fabricated as one or more integrated circuits. These integrated circuits can be implemented in any microprocessor-based device, for example such as personal computers, personal digital assistants (PDAs), mobile telephones, and the like.

Much recent investigation has been performed with respect to exploiting multi-core systems for power optimization. One approach uses a small core (e.g., CPU) for low-power operation and switches to a large core for performance-driven applications. Under this approach, the cores do not operate in a true multi-processor fashion. That is, when the small core is active, the large core is inactive, and vice versa. The principal challenge with the multi-core approach is that the CPU state must be moved from one core to the other before changing cores. In addition, cache drain latencies can be severe as all dirty lines must be written to memory as part of the core transition.

In contrast to the multi-core approach, the techniques described herein provide dynamic switching between multiple pipelines. These transitions may be prompted by software or by a monitored hardware condition (e.g., overflow of a performance monitor counter). By switching pipelines instead of cores, the state may be retained in most, if not all, architectural state elements in the microprocessor, most notably in the cache memories. Because the caches do not need to be drained, transitions between the pipelines are very fast, and can be done more frequently at less risk of affecting quality of service. And because this level of hardware abstraction is almost entirely transparent to the operating system, these transitions require very little, if any, software interaction.

According to some embodiments, a microprocessor includes two or more pipelines of differing complexity. In such embodiments, a complex pipeline can be selected for higher performance, and a simpler pipeline can be selected for power savings. The high-performance pipeline and the power-efficient pipeline can be entirely different hardware, sharing only some principal state nodes (for example, memories, registers, and the like) or the high-performance pipeline and the power-efficient pipeline may be virtually the same hardware pipeline operating at a significantly slower speed. In addition, the fundamental microarchitecture may be altered depending on which pipeline is active (for example, employing complex microarchitecture for performance, and simple microarchitecture for power efficiency).

FIG. 1 shows elements of a microprocessor 100 including multiple pipelines 102 according to one embodiment. Although in the described embodiments, the elements of microprocessor 100 are presented in one arrangement, other embodiments may feature other arrangements, as will be apparent to one skilled in the relevant arts based on the disclosure and teachings provided herein. For example, the elements of microprocessor 100 can be implemented in hardware, software, or combinations thereof.

Referring to FIG. 1, microprocessor 100 includes a plurality of processor pipelines 102A-N, a storage module 104, and a selection module 106. Each pipeline 102 includes a plurality of stages. In some embodiments, each pipeline 102 includes a different number of stages. Storage module 104 stores data and instructions to be processed by pipelines 102, and can include a cache 108, processor registers 110, buffers 112 such as translation lookaside buffers, and the like. Selection module 106 includes a power management module 114, and provides control signals 116 to processor pipelines 102.

Figure 2:
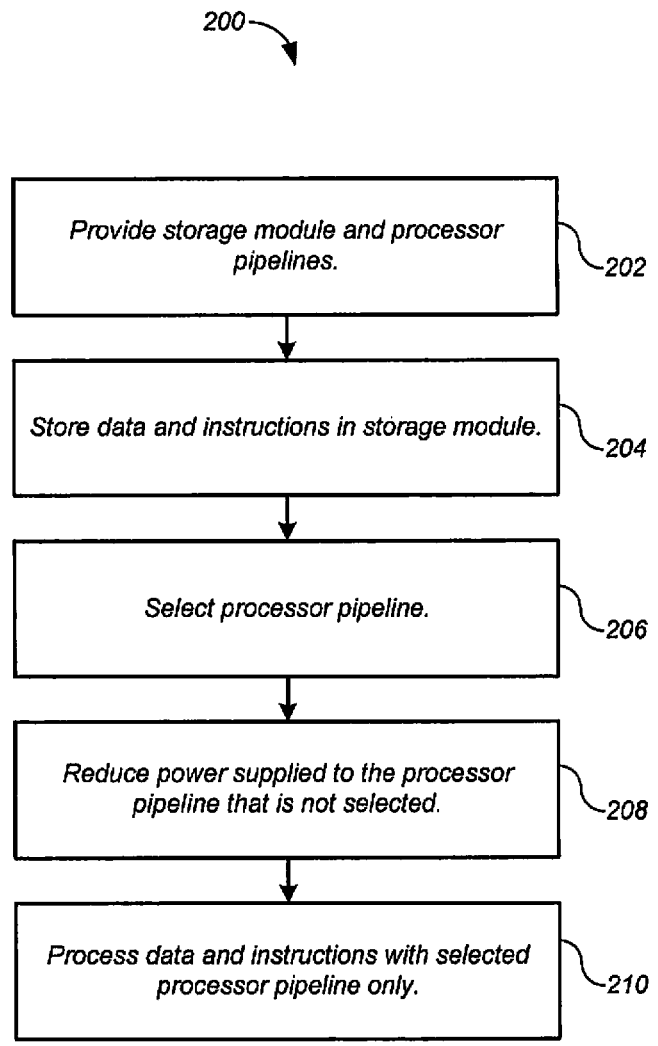
FIG. 2 shows a process for the microprocessor of FIG. 1 according to one embodiment.

FIG. 2 shows a process 200 for microprocessor 100 of FIG. 1 according to one embodiment. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, process 200 provides storage module 104 and processor pipelines 102 (step 202). Process 200 stores data and instructions in storage module 104 (step 204), for example in cache 108 and processor registers 110. Selection module 106 selects one of processor pipelines 102 (step 206). For example, selection module 106 can provide control signals 116 to processor pipelines 102 in accordance with a mode selection of a device incorporating microprocessor 100.

Power management module 114 reduces power supplied to the processor pipeline 102 that is not selected (step 208). Microprocessor 100 then processes the data and instructions with the selected processor pipeline 102 only (step 210) until selection module 106 selects a different processor pipeline 102.

Figure 3:
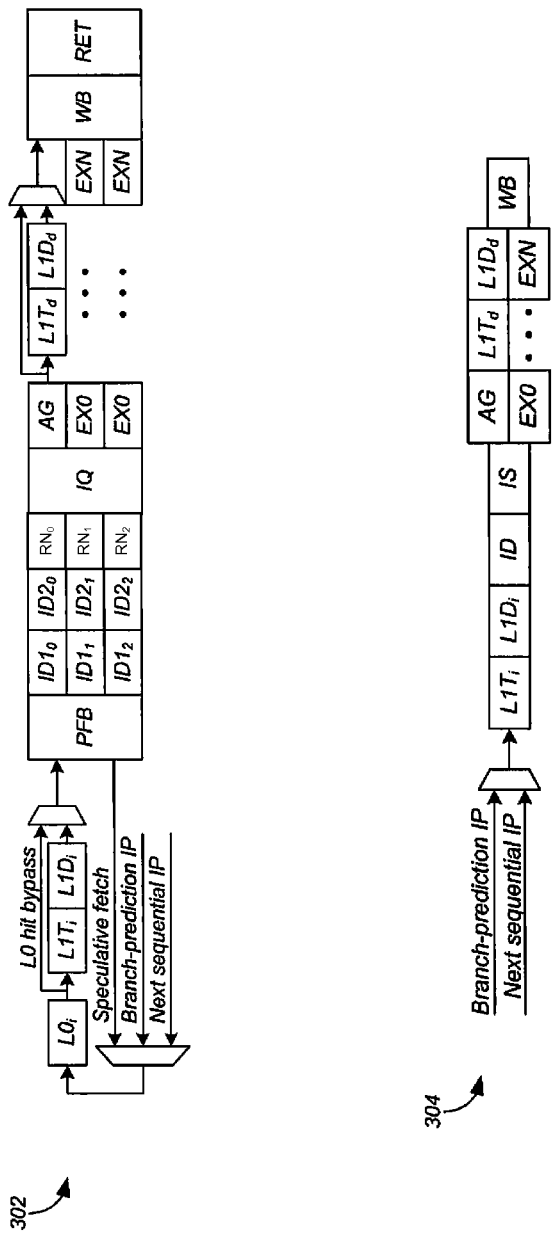
FIG. 3 shows detail of two instruction pipelines according to one embodiment.

FIG. 3 shows detail of two processor pipelines 302 and 304 according to one embodiment. Although in the described embodiments, the elements of processor pipelines 102 are presented in one arrangement, other embodiments may feature other arrangements, as will be apparent to one skilled in the relevant arts based on the disclosure and teachings provided herein. For example, the elements of processor pipelines 102 can be implemented in hardware, software, or combinations thereof. Processor pipelines 302 and 304 can be used in microprocessor 100 of FIG. 1, for example.

Referring to FIG. 3, processor pipeline 302 is a high-performance three-way superscalar processor pipeline. Processor pipeline 302 features a large degree of speculation, particularly with respect to instruction pre-fetching and full out-of-order dispatch and execution. Processor pipeline 302 also includes three independent instruction execution pipelines, which allows three instructions to be issued simultaneously. The stages of high-performance processor pipeline 302 include instruction pre-fetch stages for a multi-level cache ($L0_i$, $L1T_i$, and $L1D_i$), pre-fetch buffer (PFB), instruction decode ($ID1_0$-$ID1_2$ and $ID2_0$-$ID2_2$), register rename ($RN_0$-$RN_2$), instruction queue (IQ), address generation (AG), data cache ($L1T_d$ and $L1D_d$), multiple execution stages (EX0-EXN), register writeback (WB), and instruction retire (RET).

In contrast, processor pipeline 304 is a power-efficient scalar processor pipeline. Processor pipeline 304 operates at a significantly lower speed, and executes all instructions in order. Processor pipeline 304 includes only one instruction execution pipeline, which allows only one instruction to be issued at a time. These differences allow further power savings by disabling the high-speed, parallel access to the L0 caches, as well as the register-renaming facilities.

Both processor pipelines 302, 304 use the same serially-accessed L1 instruction caches and L1 data caches, and their associated translation look-aside buffer (TLBs). In this manner, transition between processor pipelines 302, 304 does not require flushing the cache. In addition, both processor pipelines 302, 304 reuse the same physical register file. That is, both the physical location and architectural state of the register set is retained while transitioning between processor pipelines 302, 304.

According to some embodiments, a microprocessor includes a single pipeline of variable depth. In such embodiments, the number of stages in the pipeline can be increased for greater performance, and reduced for greater power savings, where the frequency of the microprocessor scales directly with the depth of the pipeline.

Figure 4:
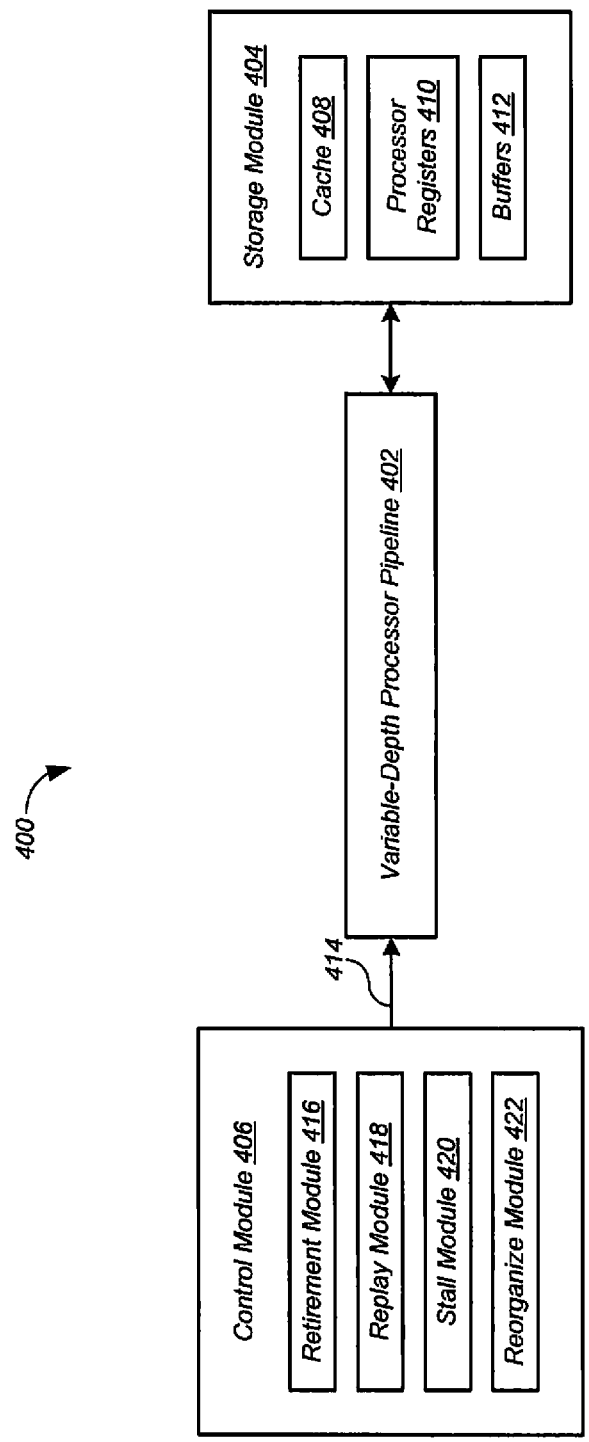
FIG. 4 shows elements of a microprocessor including a single instruction pipeline of variable depth according to one embodiment.

FIG. 4 shows elements of a microprocessor 400 including a single pipeline 402 of variable depth according to one embodiment. Although in the described embodiments, the elements of microprocessor 400 are presented in one arrangement, other embodiments may feature other arrangements, as will be apparent to one skilled in the relevant arts based on the disclosure and teachings provided herein. For example, the elements of microprocessor 400 can be implemented in hardware, software, or combinations thereof.

Referring to FIG. 4, microprocessor 400 includes a variable-depth processor pipeline 402, a storage module 404, and a control module 406. Processor pipeline 402 includes a plurality of stages (not shown), as described below. Storage module 404 stores data and instructions to be processed by processor pipeline 402, and can include a cache 408, processor registers 410, buffers 412 such as translation lookaside buffers, other memories, and the like. Control module 406 provides control signals 414 to processor pipeline 402, and can include a retirement module 416, a replay module 418, a stall module 420, and a reorganize module 422, as described below.

Figure 5:
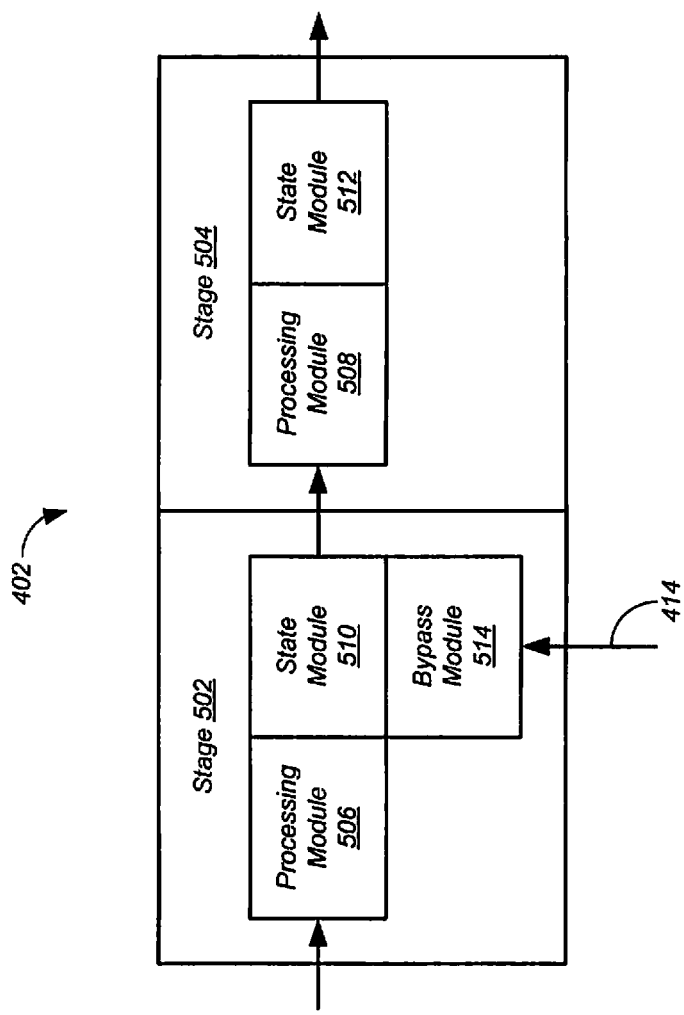
FIG. 5 shows detail of the variable-depth instruction pipeline of FIG. 4 according to some embodiments.

At least one of the stages of processor pipeline 402 can be bypassed, thereby reducing the total number of stages in processor pipeline 402, as illustrated in FIG. 5. FIG. 5 shows detail of variable-depth processor pipeline 402 of FIG. 4 according to some embodiments. Referring to FIG. 5, two consecutive stages 502 and 504 of processor pipeline 402 are shown. Each of stages 502 and 504 includes a respective processing module 506, 508, and a respective state module 510, 512. Each state module 510, 512 is adapted to store the state of the respective stage 502, 504, that is, the output of the respective processing module 506, 508. Stage 502 further includes a bypass module 514 adapted to selectively bypass state module 510 in accordance with control signals 414 (FIG. 4) provided by control module 406 (FIG. 4).

Figure 6:
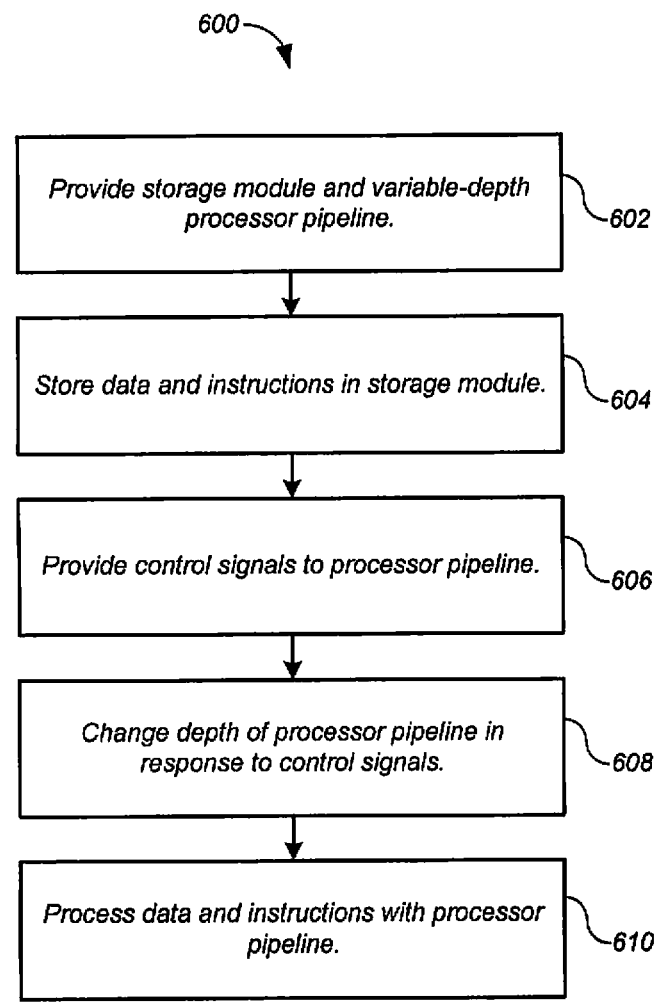
FIG. 6 shows a process for the microprocessor of FIG. 4 according to one embodiment.

FIG. 6 shows a process 600 for microprocessor 400 of FIG. 4 according to one embodiment. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Referring to FIG. 6, process 600 provides storage module 404 and variable-depth processor pipeline 402 (step 602). Process 600 stores data and instructions in storage module 404 (step 604), for example in cache 408 and processor registers 410. Control module 406 provides control signals 414 to processor pipeline 402 (step 606). For example, control module 406 can provide control signals 414 to processor pipeline 402 in accordance with a mode selection of a device incorporating microprocessor 400.

In response to control signals 414, processor pipeline 402 changes its depth, that is, changes the number of stages in processor pipeline 402 (step 608). The change can be a reduction in the number of stages or an increase in the number of stages. For example, microprocessor 400 can feature two or more modes, each associated with a predetermined number of stages. In this example, changing modes increases or reduces the number of stages in processor pipeline 402. Process 600 then processes the data and instructions with processor pipeline 402 (step 610) until selection module 106 selects a different depth for processor pipeline 402.

To decrease the number of stages in processor pipeline 402, the state modules in one or more stages are bypassed. For example, referring to FIG. 5, bypass module 514 of stage 502 bypasses state module 510 of stage 502 in response to control signals 414. When bypassed, state module 510 no longer stores the output of processing module 506, but instead passes that output immediately to the processing module 508 of the next stage 504 in processor pipeline 402. In this way, stages 502 and 504 merge to form a single stage, thereby reducing the number of stages in processor pipeline 402.

Conversely, to increase the number of stages in processor pipeline 402, one or more bypassed state modules are restored, that is, the state modules are not bypassed. In the present example, referring again to FIG. 5, bypass module 514 of stage 502 restores state module 510 of stage 502 in response to control signals 414. When restored, state module 510 stores the output of processing module 506 for one or more clock cycles before passing that output to the processing module 508 of the next stage 504 in processor pipeline 402. In this way, merged stages 502 and 504 separate to form two independent stages, thereby increasing the number of stages in processor pipeline 402.

Before changing the depth of processor pipeline 402, control module 406 can manage the instructions for processor pipeline 402 to accommodate the change in depth. For example, retirement module 416 can retire instructions in processor pipeline 402 before changing the number of stages. As another example, replay module 418 can reissue unretired instructions in processor pipeline 402 before changing the number of stages. As another example, stall module 420 can stall one or more of the stages in processor pipeline 402 before changing the number of stages. As another example, reorganize module 422 can copy the state of processor pipeline 402 to a memory of storage module 404, then change the number of stages in the state in the memory, and then copy the state from the memory processor pipeline 402 before changing the number of stages. These and other techniques can be used, either alone or in combination.

Figure 7:
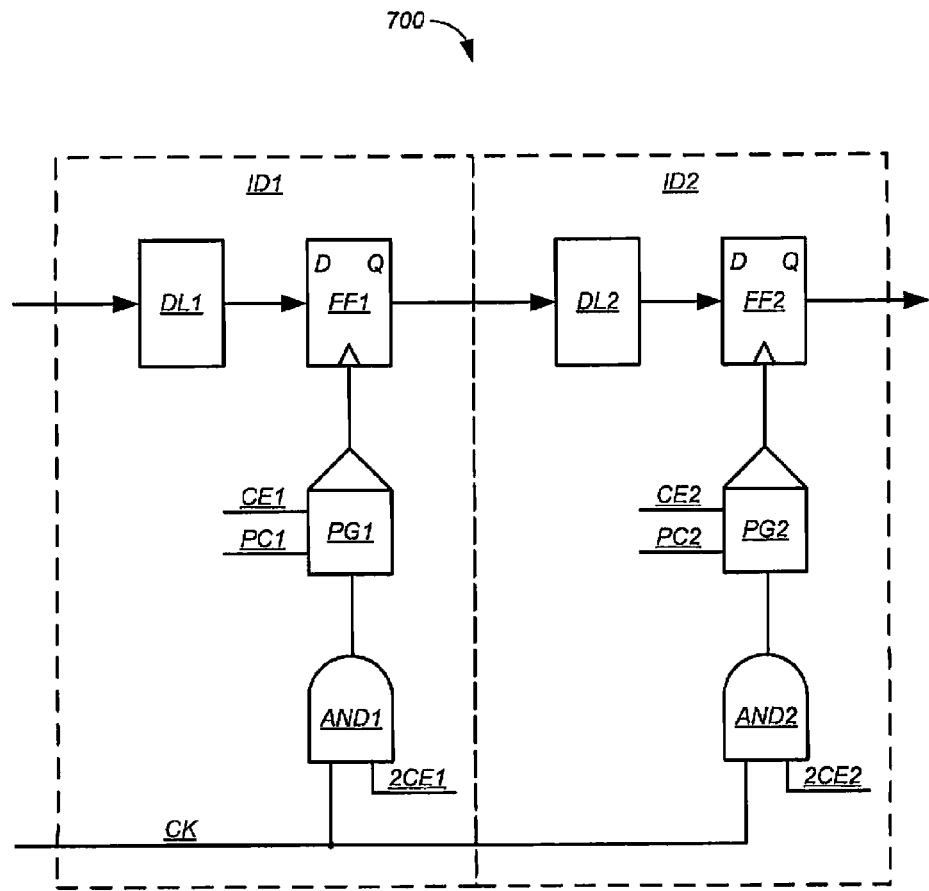
FIG. 7 shows an implementation of the variable-depth instruction pipeline of FIG. 4 according to some embodiments.

FIG. 7 shows an implementation 700 of variable-depth processor pipeline 402 of FIG. 4 according to some embodiments. Referring to FIG. 7, implementation 700 includes two instruction decode stages ID1 and ID2. Stage ID1 includes a processing element implemented as decode logic DL1, a state module implemented as a pulsed flip-flop FF1, and a bypass element implemented as a gated pulse generator PG1. Stage ID1 also includes an AND gate AND1 that provides second-level clock gating, thereby realizing additional power savings when stages ID1 and ID2 are merged. Similarly, stage ID2 includes decode logic DL2, a pulsed flip-flop FF2, a gated pulse generator PG2, and an AND gate AND2. Each of pulsed flip-flops FF1 and FF2 is preferably implemented as a D flip-flop with an active-high pulsed clock.

Both AND gates AND1 and AND2 receive the main clock signal CK, but are gated by different second-level clock gating signals 2CE1 and 2CE2. When stages ID1 and ID2 are not merged, both signals 2CE1 and 2CE2 are held high, thereby providing main clock signal CK to both pulse generators PG1 and PG2.

Pulse generators PG1 and PG2 also receive control signals including clock enable signals CE1 and CE2, respectively, and pulse controller signals PC1 and PC2, respectively. To merge instruction decode stages ID1 and ID2, gated pulse generator PG1 is controlled to provide a high-level output to the clock input of flip-flop FF1. This renders flip-flop FF1 transparent, thereby combining stages ID1 and ID2 into a single stage in processor pipeline 402. Gated pulse generator PG1 can be disabled by negating clock enable signal CE1 and pulse controller signal PC1.

Each of AND gates AND1 and AND2 provides its output to multiple pulse generators PG1 and PG2, respectively. Therefore substantial power savings can be achieved by second-level clock gating. When stages ID1 and ID2 are merged, second-level clock gating can be achieved by negating clock gating signal 2CE1.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. An apparatus comprising:
    a storage module configured to store data and instructions;
    a processor pipeline configured to process the data and instructions, wherein the processor pipeline comprises N stages, where N is an integer greater than 1, wherein each of the N stages comprises hardware, and wherein the hardware comprises
        a decoding element configured to generate a first output based on output of a previous stage in the processor pipeline,
        a gated pulse generator comprising a plurality of inputs and configured to generate a second output based on a clock signal, an enable signal, and a control signal, wherein the clock signal and the control signal are received by a respective one of the plurality of inputs, and
        a flip-flop element configured to generate a third output based on the first output and the second output; and
    a depth control module configured to generate the enable signal and the control signal to change the number N of the N stages in the processor pipeline.

2. The apparatus of claim 1, wherein:
    the flip-flop element of each of the N stages is configured to store a state of a corresponding one of the N stages; and
    the gated pulse generator of each of the N stages is configured to selectively bypass the flip-flop element in accordance with the control signal provided by the depth control module.

3. The apparatus of claim 2, wherein the depth control module comprises:
    a retirement module configured to retire instructions in the processor pipeline before changing the number N of the N stages in the processor pipeline;
    a replay module configured to reissue unretired instructions in the processor pipeline before changing the number N of the N stages in the processor pipeline;
    a stall module configured to stall one or more of the N stages in the processor pipeline before changing the number N of the N stages in the processor pipeline; and
    a reorganize module configured (i) to copy a state of the processor pipeline to the storage module, (ii) then to change the number N of the N stages in the state of the processor pipeline in the storage module, and (iii) then to copy the state of the processor pipeline from the storage module to the processor pipeline before changing the number N of the N stages in the processor pipeline.

4. A microprocessor comprising the apparatus of claim 1.

5. An integrated circuit comprising the microprocessor of claim 4.

6. A device comprising the integrated circuit of claim 5.

7. The apparatus of claim 1, wherein the depth control module is configured to merge the N stages into a single stage including controlling the gated pulse generator to change the second output from a first state to a second state.

8. The apparatus of claim 1, wherein:
    each of the N stages comprises an AND gate configured to provide an output based on the clock signal and a gating signal; and
    each of the gated pulse generators is configured to receive the output of a corresponding one of the AND gates.

9. A method comprising:
    providing a storage module and a processor pipeline, wherein the processor pipeline comprises N stages, where N is an integer greater than 1;
    storing data and instructions in the storage module;
    copying a state of the processor pipeline to the storage module, wherein the state of the processor pipeline comprises states of outputs of processing modules in the N stages of the processor pipeline;
    subsequent to the copying of the state of the processor pipeline, changing the number N of the stages in the state of the processor pipeline in the storage module;
    subsequent to the changing of the number N of the N stages in the state of the processor pipeline in the storage module, copying the state of the processor pipeline from the storage module to the processor pipeline prior to changing the number N of the N stages in the processor pipeline;
    changing the number N of the N stages in the processor pipeline; and
    processing the data and instructions with the processor pipeline.

10. The method of claim 9, wherein:
    at least one of the stages includes a state module configured to store a state of the at least one of the stages; and the changing of the number N of the N stages in the processor pipeline comprises selectively bypassing the state module.

11. The method of claim 10, further comprising:
retiring instructions in the processor pipeline before changing the number N of the N stages in the processor pipeline;
reissuing unretired instructions in the processor pipeline before changing the number N of the N stages in the processor pipeline; and
stalling one or more of the stages in the processor pipeline before changing the number N of the N stages in the processor pipeline.

12. A method comprising:
providing a storage module and a processor pipeline, wherein the processor pipeline comprises N stages, where N is an integer greater than 1;
storing data and instructions in the storage module, wherein the processor pipeline is separate from the storage module;
copying a first state of the processor pipeline to the storage module, wherein the first state of the processor pipeline comprises states of outputs of processing modules in the N stages of the processor pipeline, and wherein the processor pipeline, while in the first state, comprises the N stages;
subsequent to the copying of the first state of the processor pipeline to the storage module, changing the number N of the stages in the first state of the processor pipeline stored in the storage module to provide a second state of the processor pipeline stored in the storage module, wherein the second state of the processor pipeline stored in the storage module has a different number of stages than the processor pipeline separate from the storage module;
subsequent to the changing of the number N of the N stages in the first state of the processor pipeline stored in the storage module and prior to changing the number N of the N stages in the processor pipeline separate from the storage module, copying the second state of the processor pipeline from the storage module to the processor pipeline separate from the storage module;
changing the number N of the N stages in the processor pipeline separate from the storage module; and
processing the data and instructions with the processor pipeline.

* * * * *